(12) United States Patent
Hognaland (10) Patent No.: US 12,187,535 B2
(45) Date of Patent: Jan. 7, 2025

(54) STORAGE SYSTEM (71) Applicant: Autostore Technology AS, Nedre Vats (NO)

(72) Inventor: Ingvar Hognaland, Nedre Vats (NO)

(73) Assignee: AutoStore Technology AS, Nedre Vats (NO)

( * ) Notice: Subject to any disclaimer, the term of this patent is extended or adjusted under 35 U.S.C. 154(b) by 0 days.

(21) Appl. No.: 18/326,403

(22) Filed: May 31, 2023

(65) Prior Publication Data
US 2023/0303324 A1    Sep. 28, 2023

Related U.S. Application Data

(63) Continuation of application No. 17/126,696, filed on Dec. 18, 2020, now Pat. No. 11,702,284, which is a
(Continued)

(30) Foreign Application Priority Data

Jun. 11, 2015    (NO) .................................... 20150758

(51) Int. Cl.
*B65G 1/04*    (2006.01)
*B25J 5/02*    (2006.01)
(Continued)

(52) U.S. Cl.
CPC ............. *B65G 1/0464* (2013.01); *B25J 5/02* (2013.01); *B25J 9/1679* (2013.01); *B25J 9/1687* (2013.01);
(Continued)

(58) Field of Classification Search
CPC .... B65G 1/0464; B65G 1/0478; B65G 1/065; B65G 1/137; B65G 1/1373; B65G 1/04;
(Continued)

(56) References Cited

U.S. PATENT DOCUMENTS 4,088,232 A * 5/1978 Lilly .................... B65G 1/0464
414/282
6,011,998 A    1/2000 Lichti et al.
(Continued)

FOREIGN PATENT DOCUMENTS

CN    1216285 A    5/1999
CN    101565123 A    10/2009
(Continued)

OTHER PUBLICATIONS

International Search Report issued in PCT/EP2016/063244 mailed on Aug. 22, 2016 (5 pages).
(Continued)

*Primary Examiner* — Thomas Randazzo
(74) *Attorney, Agent, or Firm* — Baker Botts L.L.P.

(57) ABSTRACT

A storage system for storing product items includes a grid structure and a number of first storage bins configured to be stored in vertical stacks in the grid structure. Each first storage bin is configured to contain at least one product item. A vehicle is arranged to move horizontally at the top level of the grid structure, and further arranged to pick up, carry, and place the first storage bins at desired locations within the grid structure. The storage system further includes a robot device that includes a movable arm with a picking mechanism in one end thereof. The robot device is configured to move a storage item between a first location and a second location by means of its picking mechanism. The first location is the location of a first storage bin stored in the storage grid.

15 Claims, 6 Drawing Sheets

Related U.S. Application Data continuation of application No. 15/580,881, filed as application No. PCT/EP2016/063244 on Jun. 10, 2016, now Pat. No. 10,947,042.

(51) Int. Cl.
  *B25J 9/16* (2006.01)
  *B25J 15/00* (2006.01)
  *B65G 1/06* (2006.01)
  *B65G 1/137* (2006.01)

(52) U.S. Cl.
  CPC ............ *B25J 15/00* (2013.01); *B65G 1/0478* (2013.01); *B65G 1/065* (2013.01); *B65G 1/137* (2013.01); *B65G 1/1373* (2013.01)

(58) Field of Classification Search
  CPC . B65G 61/00; B25J 5/02; B25J 9/1679; B25J 9/1687; B25J 15/00; B25J 11/00
  See application file for complete search history.

(56) References Cited

U.S. PATENT DOCUMENTS

| | | | | |
|---|---|---|---|---|
| 6,289,260 | B1* | 9/2001 | Bradley | B65G 1/1376 414/280 |
| 7,381,022 | B1 | 6/2008 | King | |
| 8,628,289 | B1* | 1/2014 | Benedict | B65G 1/0478 414/217 |
| 8,997,438 | B1* | 4/2015 | Fallas | B25J 9/0093 901/17 |
| 9,802,317 | B1* | 10/2017 | Watts | G05B 19/402 |
| 10,947,042 | B2* | 3/2021 | Hognaland | B65G 1/065 |
| 2001/0038784 | A1* | 11/2001 | Peltomaki | B65G 1/0464 414/273 |
| 2002/0065571 | A1 | 5/2002 | Kamiguchi et al. | |
| 2011/0153065 | A1* | 6/2011 | Tomioka | B25J 9/1687 700/226 |
| 2013/0110280 | A1* | 5/2013 | Folk | B25J 9/0093 700/215 |
| 2013/0173049 | A1* | 7/2013 | Brunner | G06Q 10/08 700/216 |
| 2013/0259617 | A1* | 10/2013 | Wang | H01L 21/67769 414/561 |
| 2014/0017052 | A1* | 1/2014 | Honkanen | B65G 1/0421 414/626 |
| 2014/0244026 | A1 | 8/2014 | Neiser | |
| 2015/0073589 | A1* | 3/2015 | Khodl | B25J 5/007 700/218 |
| 2015/0098775 | A1* | 4/2015 | Razumov | B66F 11/04 414/807 |
| 2015/0127143 | A1* | 5/2015 | Lindbo | G05B 15/02 700/218 |
| 2015/0147141 | A1* | 5/2015 | Truyens | B25J 15/0616 414/800 |
| 2015/0346708 | A1* | 12/2015 | Mattern | B25J 21/00 700/114 |
| 2016/0145058 | A1* | 5/2016 | Lindbo | B65G 1/0457 700/218 |
| 2016/0194151 | A1* | 7/2016 | Lindbo | B65G 1/0492 |
| 2016/0244262 | A1* | 8/2016 | O'Brien | B25J 9/16 |
| 2017/0362031 | A1* | 12/2017 | Solignac | B66C 1/28 |

FOREIGN PATENT DOCUMENTS

| | | | |
|---|---|---|---|
| CN | 103442997 A | 12/2013 | |
| DE | 4028059 A1 * | 3/1992 | ............... B25J 5/04 |
| EP | 2651789 A1 | 10/2013 | |
| ES | 2409459 A1 | 6/2013 | |
| JP | 860228090 A | 11/1985 | |
| JP | S61206709 A | 9/1986 | |
| JP | H05-317998 A | 12/1993 | |
| JP | 2002-219681 A | 8/2002 | |
| KR | 20140065058 A | 5/2014 | |
| NO | 317366 B1 | 10/2004 | |
| WO | 92/04713 A1 | 3/1992 | |
| WO | 2013/087554 A1 | 6/2013 | |
| WO | 2013/167907 A1 | 11/2013 | |
| WO | 2014/090684 A1 | 6/2014 | |
| WO | 2014/195901 A1 | 12/2014 | |
| WO | 2014/195902 A1 | 12/2014 | |
| WO | 2014203126 A1 | 12/2014 | |
| WO | 2015/019055 A1 | 2/2015 | |
| WO | 2016/198565 A1 | 12/2016 | |

OTHER PUBLICATIONS

Written Opinion of the International Searching Authority issued in PCT/EP2016/063244 mailed on Aug. 22, 2016 (7 pages).
Norwegian Search Report issued in NO 20150758 mailed on Jan. 11, 2016 (2 pages).
Office Action issued in Chinese Application No. 201680033686.1; Dated Apr. 15, 2020 (15 pages).
Notice of Reasons for Refusal issued in Japanese Application No. 2021-124418 mailed on Oct. 26, 2022 (6 pages).
Office Action issued in counterpart European Patent Application No. 19184185.7 mailed on Jun. 13, 2023 (29 pages).
Commercial Manual—AutoStore Concept Version 01.10a (36 pages).
YouTube video: Bastian Solutions—Live System Demo at Booth #3953, Retrieved from Internet on Feb. 18, 2015; Retrieved from Internet: URL: https://www.youtube.com/watch?v=gi-7ili5pBI (1 page).
Wu Yuting, Notification of the First Office Action and Search Report for Chinese Patent Application No. 202111028354.3, mailed Nov. 14, 2023, 15 pages (including translation), National Intellectual Property Administration, PRC, Beijing, PRC.
Brieux Palais, Notification of First Examination for European Patent Application No. 22154361.4, mailed Jun. 23, 2022, 6 pages, European Patent Office, Rijswijk, Netherlands.

* cited by examiner

STORAGE SYSTEM

CROSS-REFERENCE TO RELATED APPLICATIONS

The present application is a continuation of prior U.S. patent application Ser. No. 17/126,696 filed on Dec. 18, 2020, now U.S. Pat. No. 11,702,284, which is a continuation of U.S. patent application Ser. No. 15/580,881 filed on Dec. 8, 2017, now U.S. Pat. No. 10,947,042, which is a 371 National Phase application of international application PCT/EP2016/063244 filed on Jun. 10, 2016, which claims priority to Norwegian Patent Application number 20150758 filed on Jun. 11, 2015.

FIELD OF THE INVENTION

The present invention relates to a storage system.

BACKGROUND OF THE INVENTION

The Applicant's already known AutoStore system is a storage system comprising a three dimensional storage grid wherein storage bins are stacked on top of each other to a certain height.

The storage grid is constructed as aluminium columns interconnected by top rails. A number of vehicles, or robot vehicles, are arranged on the top rails and may move horizontally on top of the storage grid.

Each vehicle is equipped with a lift for picking up, carrying, and placing bins that are stored in the storage grid.

The system also comprises delivery and/or supply stations, where one or several items are picked out from the storage bin or where one or several items are filled into the storage bin.

When an item of a product type stored in a storage bin is to be retrieved from the storage grid, the robot vehicle is arranged to pick up the storage bin containing that product type and then transport it to a bin lift device The bin lift device is transporting the storage bin to the delivery and/or supply stations, where the item of the product type is retrieved from the storage bin. The storage bin with the remaining items of the product type is thereafter returned to the storage grid by means of a bin lift device and a robot vehicle.

The same procedure is used for refilling items into the storage grid. First, items are filled into a storage bin at a delivery and/or supply station. The bin lift device is then lifting the storage bin up to the upper level where a robot vehicle is transporting the storage bin into its correct position within the storage grid.

A storage control and communication system may be used to monitor inventory, location of storage bins (within storage grid and/or during transport), charge level, etc. The storage control and communication system may also comprise, or may be provided in communication with, a control system for controlling the robot vehicles in order to avoid collision.

It has been found that relatively long time is used by the storage system to transport storage bins from the top of the grid and to the delivery and/or supply stations. Hence, one or more embodiments of the invention provide a more time efficient storage system.

SUMMARY OF THE INVENTION

One or more embodiments of the present invention relates to a storage system for storing product items, comprising a grid structure, wherein the grid structure has a top level. A number of first storage bins is configured to be stored in vertical stacks in the grid structure, wherein each first storage bin is configured to contain at least one product item; a vehicle, arranged to move horizontally at the top level of the grid structure, and further arranged to pick up, carry, and place the first storage bins at desired locations within the grid structure. According to one or more embodiments of the present invention, the storage system further comprises a robot device comprising a movable arm with a picking mechanism in one end thereof, the robot device is configured to move a storage item between a first location and a second location by means of its picking mechanism;

the first location is the location of a first storage bin stored in the storage grid.

It should be noted that even though each first storage bin is configured to contain at least one product item, it is fully possible to store empty first storage bins in the storage grid.

Embodiments of the invention are apparent from the enclosed dependent claims.

DETAILED DESCRIPTION

Embodiments of the invention will be described in the following with reference to the enclosed drawings, where.

Figure 1:
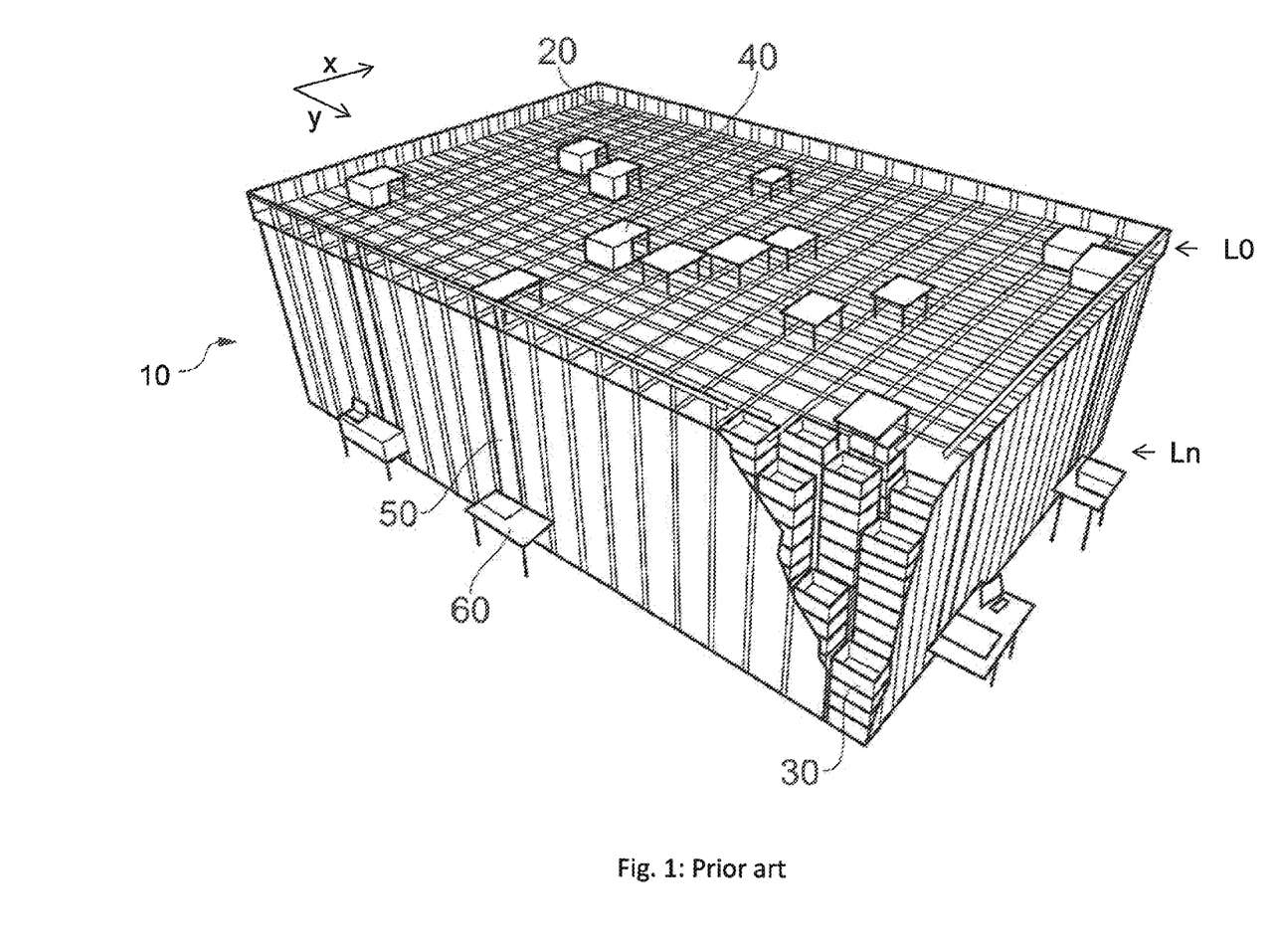
FIG. 1 discloses a prior art storage system.

It is now referred to FIG. 1. Here it is shown a storage system 10 comprising a grid structure 20 for storing products in storage bins 30. Each storage bin 30 is configured to contain one or several product items.

As shown in FIG. 1, a certain number of the storage bins 30 are configured to be stored in vertical stacks within the grid structure 20.

A vehicle 40 is arranged to move horizontally at a top level L0 of the grid structure 20, and further arranged to pick up, carry, and place the first storage bins 30 at desired locations.

The storage system 10 further comprises a delivery and/or supply station 60. The delivery and/or supply station 60 is provided on the floor of the building onto which the storage grid 20 is arranged. This floor level is denoted Ln, where n is the number of storage bins 30 that can be stacked in the storage grid 20. The delivery and/or supply station 60 is used to prepare picked product items from the grid structure 20 for delivery to a receiver (for example a buyer of a product item). The delivery and/or supply station 60 is also used to register product items from a supplier (for example a manufacturer of product items) before placing the product items within the grid structure 20.

It should be noted that there may be several delivery and/or supply stations 60, and least one of these delivery and/or supply stations 60 may be separated into delivery stations and supply stations, where the delivery stations handle product items picked from the grid structure and where the supply stations handle product items to be placed into the grid structure.

The system in FIG. 1 also comprises a bin lift device 50, arranged to transport the storage bins 30 between the top level L0 of the grid structure 20 and the delivery and/or supply station 60. In FIG. 1 this transport is shown in a vertical direction.

The storage system 10 shown in FIG. 1 is considered to be prior art.

In the following, the term "first storage bin" is used for the storage bins 30 stored in the grid structure 20 and which are to be transported to the delivery and/or supply station 60 via the bin lift device 50.

Figure 2:
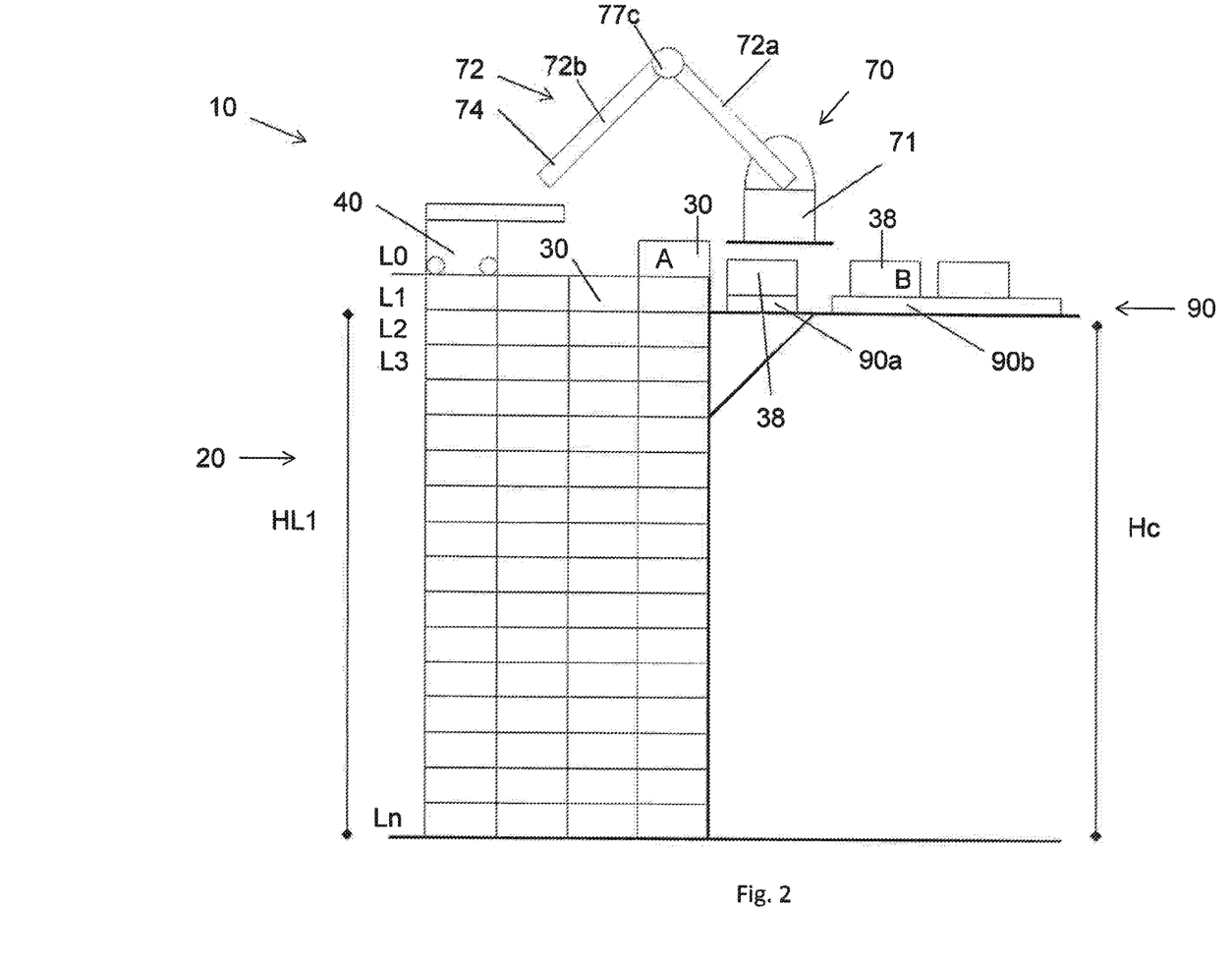
FIG. 2 illustrates schematically a side view of an embodiment of a storage system in accordance with one or more embodiments of the invention.
Figure 3:
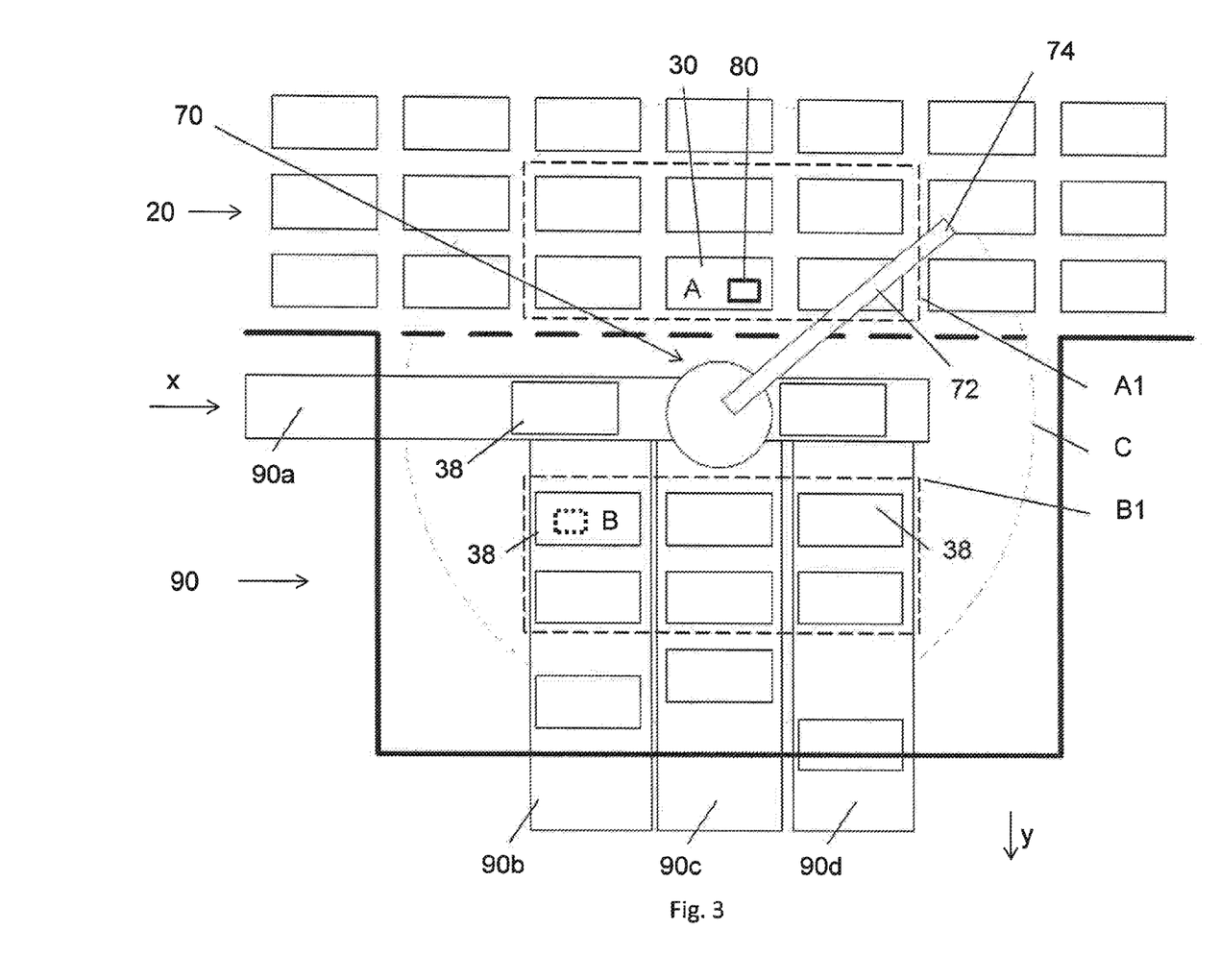
FIG. 3 illustrates the embodiment in FIG. 2 from above.

First Embodiment—FIGS. 2 and 3

It is now referred to FIGS. 2 and 3. As in FIG. 1, the storage system 10 comprises a storage grid 20 with stacks of storage bins 30. Levels L0, L1, L2-Ln are indicated.

The vehicle 40 is also shown. The particular vehicle 40 shown in FIG. 2 is considered known. The prior art vehicle 40 may travel in the horizontal direction (along a horizontal x-axis and a horizontal y-axis as indicated in FIG. 1) on level L0 of the grid structure 20. The vehicle 40 comprises a lift (not shown) for picking up storage bins 30 and for transporting the storage bins 30 to desired locations within the grid structure such as from the grid structure 20 to a delivery and/or supply station 60 via bin lift device 50, from the delivery and/or supply station 60 to the storage grid 20 via bin lift device 50, internally within the grid structure 20.

For example, if a desired product item is located in a storage bin 30 at level L3, and below other storage bins 30, the vehicle 40 may first move the upper storage bins 30 positioned directly above the storage bin 30 to be picked (at levels L2 and L1) to other available locations on top of the grid structure in order to get access to the desired storage bin 30 at level L3.

It should be noted that the particular design of the prior art vehicle 40 shown in FIG. 2 renders temporary storage of storage bins 30 on level L0 possible. In FIG. 2, it is shown a storage bin 30 at a location A located on level L0. Of course, this storage bin at location A will prevent access to the storage bins directly beneath this storage bin. Moreover, the storage bin 30 at location A will also represent an obstacle to moving vehicles 40.

In FIG. 2 it is disclosed that the storage system 10 further comprises a robot device 70.

The robot device 70 comprises a base 71 connected to a movable arm 72. In FIG. 2, it is shown that the movable arm 72 comprises a first arm section 72a connected to the base 71 and a second arm section 72b connected to the first arm section 72a via a pivotal joint 72c. The robot device 70 further comprises a picking mechanism 74 at the outer end of the second arm section 72b.

It should be noted that the robot device 70 itself is considered to be known, as several such types of robots are commercially available.

In FIG. 2 it is shown that the base 71 of the robot device 70 is located at a distance above level L0.

The robot device 70 is configured to move a storage item 80 between a first location A and a second location B by means of its picking mechanism 74 (FIG. 3). In addition, the robot device 70 may be configured to move the entire first and/or second storage bin 30; 38 by means of its picking mechanism 74.

The robot device 70 may during use be located with its movable arm 72 above a top level L0 of the storage grid 20 or at a level below the top level L0, for example level L1.

Hence, the first location A may be the location of a first storage bin 30 stored at the top level L0 or at the level L1 directly below the top level L0 of the storage grid 20. Again, a storage bin 30 at level L1 is only accessible if there is no storage bin 30 at level L0 directly above it (at the same x- and y-location).

The robot device 70 is provided in communication with a vehicle control system controlling the vehicles 40 in order to for example avoid collision between the vehicles 40 and the robot device 70. It should be noted that there are several ways of achieving this—there may be one main control system which controls the robot device 70 and each of the vehicles 40 in detail. For example, a main control system may define a time slot for vehicle movement within an area close to the robot device 70, in which time slot the robot device 70 is instructed to move its arm to a position where no collision may occur. Then, another time slot may be defined in which the vehicles are instructed to stay away from the area close to the robot device 70. Alternatively, the control system may be of a type where the robot device 70 and the vehicles 40 are more or less autonomous. For example, they may be equipped with sensors connected to an internal control system provided on each vehicle/robot 40.

The above vehicle control system may be part of, or may be provided in signal communication with, a storage control and communication system as mentioned above.

In FIGS. 2 and 3, the first location A is the location of a first storage bin 30 stored in or on the storage grid 20, while the second location B is a location of a conveyor system generally referred to by reference number 90. The conveyor system 90 is arranged adjacent to the storage grid 20. The second location B may be the location of a second storage bin 38 arranged on the conveyor system 90 as shown in FIGS. 2 and 3 or indicate the location of the conveyor system 90 itself.

The conveyor system 90 may comprise one conveyor belt, conveyor chain or any other type of conveyors suitable for transporting a product item 80 or a second storage bin 38 containing one or several storage items 80. The conveyor system 90 may also comprise several such conveyors.

The conveyor system 90 may be configured to transport the product item 80 or the second storage bin 38 containing product items 80 to the delivery and/or supply station 60, thereby acting as the robot lift 50 mentioned earlier.

In FIG. 2, it is shown that the conveyor system 90 close to the robot device 70 is provided at a height Hc equal to, or above, a height HL1 of the level L1 directly below the top level L0. Of course, other parts of the conveyor system 90 may be located at lower heights.

The one or more embodiments of present invention makes it possible to increase the efficiency of the storage system 10 by avoiding, entirely or partially, the transportation of the first storage bins 30 to the delivery and/or supply station 60 via the bin lift device 50.

Alternatively, one or more embodiments of the invention makes it possible to arrange delivery and/or supply station(s) 60 at other levels, for example at a height corresponding to the height indicated in FIG. 2, and at a location in a room situated adjacent to the room in which the storage grid 20 is arranged.

As mentioned above, the first storage bins 30 have a design adapted for being stacked above each other in the grid structure 20 and for being transported by the vehicles 40 and the bin lift device 50.

However, the second storage bins 38 may also be of a different type. The second storage bins 38 may be a cardboard box used for dispatching the product item(s) 80 to the receiver, for example the above mentioned buyer of the product item(s) 80. Accordingly, the robot device 70 may perform some or all of the working operations presently performed more or less manually at the delivery and/or supply station 60. For some types of products, only the closing operation of the cardboard box and/or the provision of an address label onto the cardboard box remain.

Alternatively, the second storage bins 38 are of substantially the same type as the first storage bins 30, where the robot device 70 is picking several of, or all of the product items of an order to one receiver. The second storage bins 38 are then transported via the conveyor system 90 to the delivery and/or supply station 60, where the order is finished by repackaging the product items 80 from the second storage bin 38 into a cardboard box. This may be necessary for product items 80 which require special care, for example frangible product items 80. The operation is still more efficient since all product items 80 of one order is arriving at the delivery and/or supply station 60 at the same time.

It is once again referred to FIGS. 2 and 3. Here it is shown that the conveyor system 90 comprises a first conveyor 90a transporting second storage bins 38 in a first direction (indicated by arrow x in FIG. 3) and three conveyors 90b, 90c, 90d subsequently transporting storage bins 38 in parallel in a second direction (indicated by arrow y in FIG. 3).

It is now referred to FIG. 3. Here, a first robot arm reachable area is indicated by a dashed box A1 in the grid structure 20 and a second robot arm reachable area is indicated by a dashed box B1 outside of the grid structure 20. A product item 80 at location A is indicated within a first storage bin 30 within area A1 and a location B for the product item 80 is indicated within a second storage bin 38 within area B1. As shown, the second area B1 is located on the three parallel conveyors 90b, 90c, 90d, close to the robot device 70.

In FIG. 3, the dashed circle C is indicating the maximum reach of the picking mechanism 74 of the robot device 70. Of course, the number of first storage bins 30 within the first area A1 and the number of second storage bins 38 within the second area B1 may vary based on the size of the robot device 70 and the size of the storage bins 30, 38.

Hence, the storage control and communication system is configured to control the vehicles 40 to place a plurality of first storage bins 30 within the first robot arm 72 reachable area A1 of the storage grid 20 and then to control the robot device 70 to move the product item 80 from at the first storage bin 30 in the first robot arm 72 reachable area A1 of the storage grid 20 to the second storage bin 38 placed in the second robot arm 72 reachable area B1 outside of the storage grid 20.

When all product items 80 are placed into the second storage bin 38, the bin 38 is transported via the conveyor 90b to the next station for further handling (dispatching, repackaging or other operations at the delivery and/or supply station 60, etc). Empty second storage bins 38 are supplied via conveyor 90a, and the robot device 70 may move a second storage bin 38 from the first conveyor 90a to the free space within the second area B1.

Alternatively, the conveyors 90b, 90c, 90d may transport empty second storage bins 38 towards the robot device 70 (opposite direction of arrow y) and may move the second storage bins 38 with product items 80 onto the first conveyor 90a for further handling.

Alternatively, the robot device 70 is used to supply the storage grid 20 with product items 80. Here, the storage bins 38 may arrive to the robot device 70 and the robot device 70 is used to fill first storage bins 30 which then are moved into the desired location within the storage grid 20 by means of the vehicles 40.

According to the first embodiment, the prior art bin lift device 50 may be partially or entirely omitted in the storage system. This is highly advantageous since the bin lift device 50 in some prior art storage systems may have a height of 5 meters or more, which in total consumes a considerable amount of the total transportation time. An omission of a prior art bin lift device 50 also have the potential of mitigating logistic problems related to for example efficient sorting of product items 80.

Figure 4:
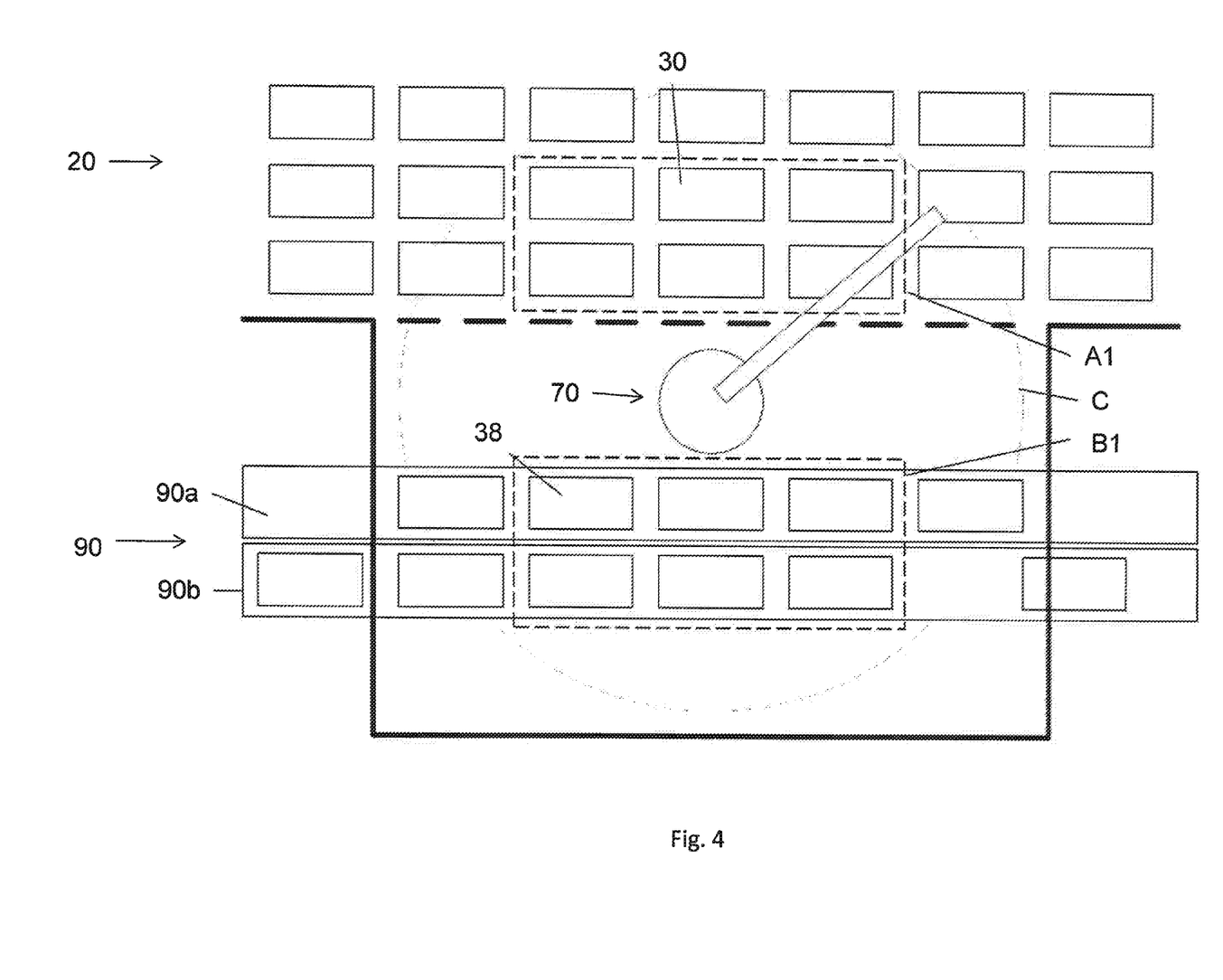
FIG. 4 illustrates an alternative embodiment from above.

Second Embodiment—FIG. 4

It is now referred to FIG. 4. The second embodiment has many features in common with the first embodiment above, and the same reference numbers has been used for those common features. For efficiency, only the differences between the second and first embodiment are described here.

In the second embodiment, the conveyor system 90 comprising a first conveyor 90a and a second conveyor 90b are arranged in parallel. They may move in the same direction or in opposite directions. As in FIG. 3 the first robot arm reachable area A1 are indicated in the storage grid 20 and second robot arm reachable area B1 are indicated on the first and second conveyor 90a.

Figures 5, 6:
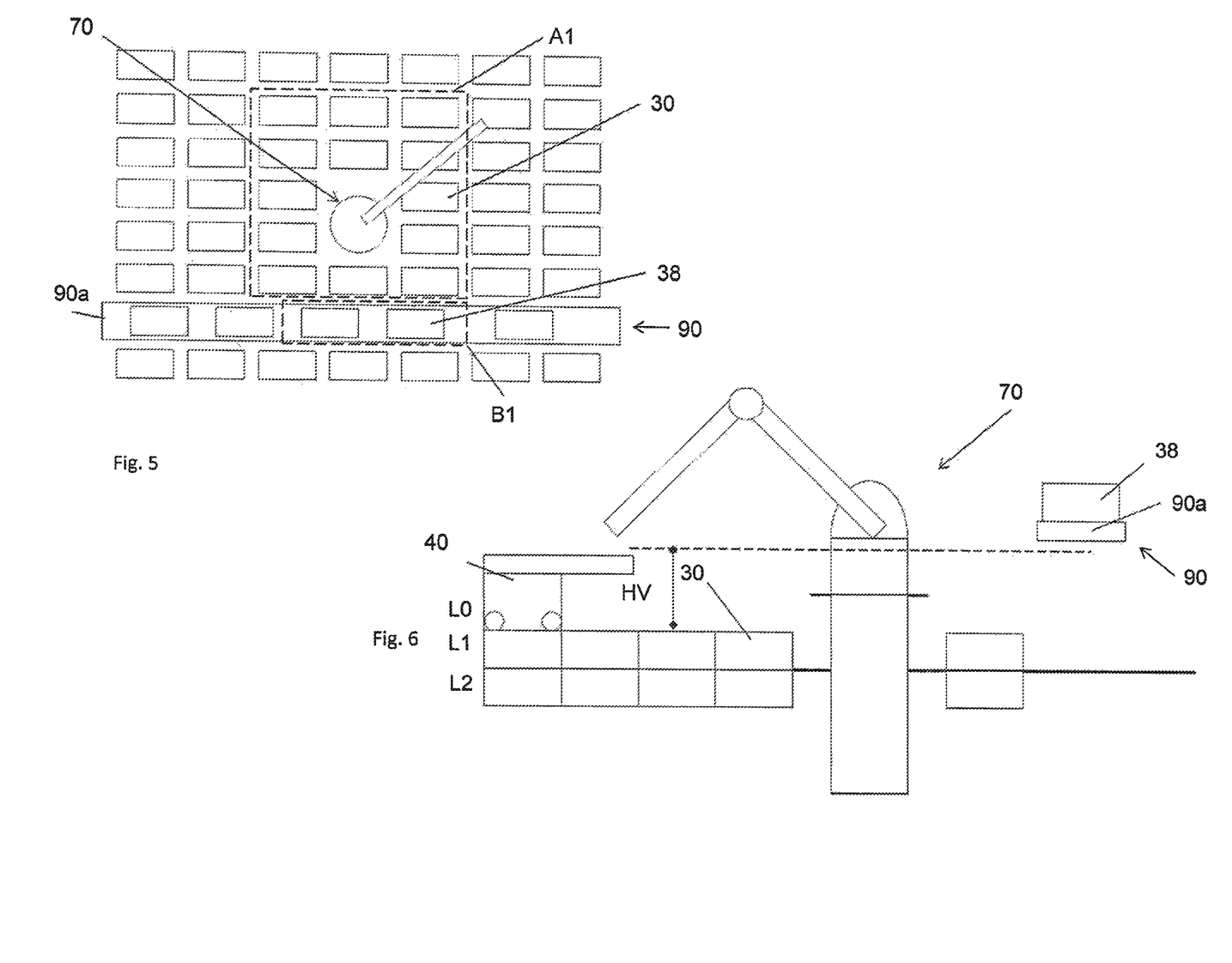
FIG. 5 illustrates yet another embodiment from above.
FIG. 6 illustrates a side view of the embodiment of FIG. 5.

Third Embodiment—FIGS. 5 and 6

It is now referred to FIGS. 5 and 6. The third embodiment has many features in common with the first embodiment above, and the same reference numbers has been used for those common features. For efficiency, only the differences between the third and first embodiment are described here.

In the third embodiment, the robot device 70 is fixed to the grid structure 20 and can be surrounded by vertical stacks of storage bins 30. Here, the conveyor system 90 is provided above, not on the side of, the storage grid 20. Moreover, the conveyor system 90 comprises only one conveyor 90a. In this way, also central parts of the storage grid 20 can be within a robot arm reachable area. In FIG. 5 a first robot arm reachable area A1 is indicated in the storage grid 20, and a second robot arm reachable area B1 is indicated on the conveyor 90a.

According to one or more embodiments of the present invention, the conveyor system 90 is provided at a height HV corresponding to the height of a vehicle 40 (see dashed line in FIG. 6) above the top level L0. Hence, vehicles 40 may pass under the conveyor system 90.

Figure 7:
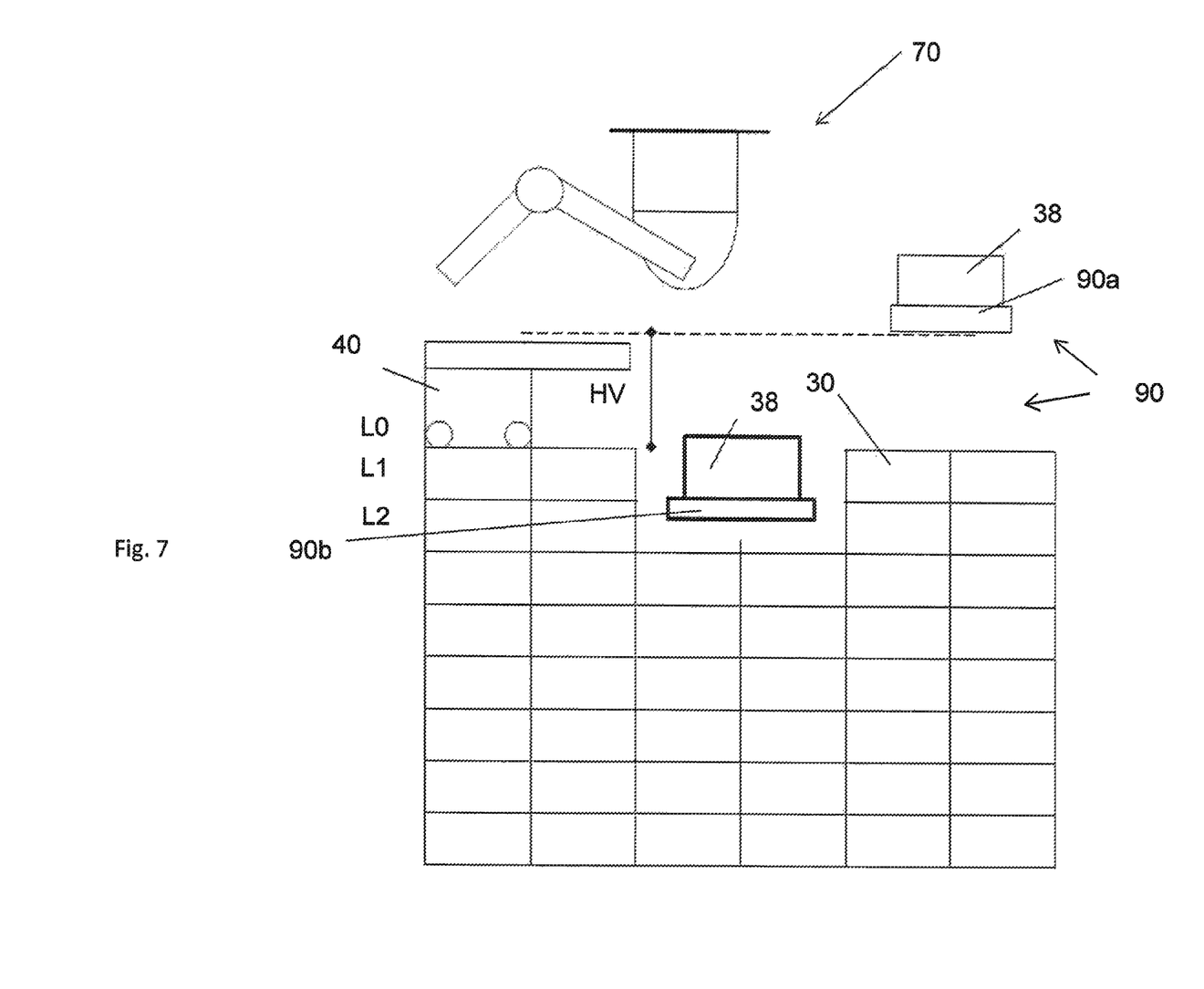
FIG. 7 illustrates yet another embodiment from the side.

Fourth Embodiment—FIG. 7

The base 71 of the robot device 79 is here supported by an iron girder, or supporting beam above the grid structure 20, such as a girder/beam supporting the roof of the building under which the storage grid 20 is provided. Such a robot device 79 may be fixed at one specific location above the grid structure 20, or be moveable by for example sliding on said girders/beams.

In such an embodiment, it is also possible to provide the conveyor system 90 with a conveyor 90a at a height HV corresponding to or above the height of a vehicle 40, so that the vehicle 40 can pass under the conveyor belt. It is also possible to provide the conveyor system 90 with a conveyor 90b within the grid 20, for example at approximately level L1 or L2.

It should be noted that the storage system 10, in all of the above embodiments, will be adapted to its intended use. The storage system 10 may comprise one or several such robot devices 70. The robot devices 70 may be provided on the side of the storage grid as in the first and second embodiments above, and/or integrated into the storage grid as in FIG. 5, or above the storage grid as in FIG. 6.

The storage control and communication system may also be configured according to its intended use. It may for example be configured to analyze a plurality of picking orders and then determine the most frequently demanded product items 80 from the picking orders. Based on this, it may configure or control the vehicles 40 to place the first storage bins 30 containing the most frequently demanded product items 80 in the first area A1.

Moreover, the storage control and communication system may further be configured to control the robot device 70 to move product items 80 from more than one first storage bin 30 in the first robot arm 72 reachable area A1 of the storage grid 20 to at least one second storage bin 38 placed in the second robot arm 72 reachable area B1 outside of the storage grid 20. As described above, the robot device 70 will then be able to carry out a picking order entirely or partially and hence make the picking operation more efficient.

In the preceding description, various aspects of the assembly according to one or more embodiments of the invention have been described. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

What is claimed is:

1. A robot device comprising:
   a base; and
   a movable arm, operably coupled to the base, with a picking mechanism in one end thereof,
   wherein the robot device is configured to move a storage item between a first location and a second location by means of the picking mechanism, and
   wherein the first location is the location of a first storage bin stored at a top level or a level directly below the top level in a storage grid.

2. The robot device according to claim 1, wherein the robot device is provided in communication with a vehicle control system controlling vehicles on the storage grid, in order to avoid collision between vehicles and the robot device.

3. The robot device according to claim 1, wherein the base is supported by an iron girder or supporting beam above the storage grid.

4. The robot device according to claim 1, wherein the movable arm comprises:
   a first arm section connected to the base; and
   a second arm section connected to the first arm section via a pivotal joint,
   wherein the one end with the picking mechanism is an end of the second arm section distal to the pivotal joint.

5. The robot device according to claim 4, further comprising a storage control and communication system configured to:
   control the robot device to move a product item from at least one first storage bin of the storage item in a first robot arm reachable area of the storage grid to at least one second storage bin placed in a second robot arm reachable area outside of the storage grid.

6. The robot device according to claim 1, wherein the second location is the location of a second storage bin arranged on a conveyor system arranged adjacent to the storage grid.

7. The robot device according to claim 6, wherein the robot device is configured to move the first storage bin and the second storage bin by way of the picking mechanism.

8. A method comprising:
   moving a storage item between a first location and a second location with a picking mechanism of a robot device,
   wherein the picking mechanism is at one end of a movable arm operably coupled to a base of the robot device, and
   wherein the first location is the location of a first storage bin stored at a top level or a level directly below the top level in a storage grid.

9. The method according to claim 8, further comprising:
   fixing the base about an iron girder or supporting beam above the storage grid.

10. The method according to claim 8, further comprising:
    sliding the base about an iron girder or supporting beam above the storage grid.

11. The method according to claim 8, further comprising:
    filling, with the picking mechanism of the robot device, a storage bin with the storage item.

12. The method according to claim 8, further comprising:
    pivoting a second arm section of the movable arm about a first arm section of the movable arm with a pivotal joint,
    wherein the first arm section is connected to the base, and
    wherein the one end with the picking mechanism is an end of the second arm section distal to the pivotal joint.

13. The method according to claim 12, further comprising:
    moving, with the picking mechanism of the robot device, a product item of the storage item from at least one first storage bin in a first robot arm reachable area of the storage grid to at least one second storage bin placed in a second robot arm reachable area outside of the storage grid.

14. The method according to claim 8, further comprising:
    communicating with the robot device via a vehicle control system controlling vehicles on [a] the storage grid to avoid collision between a vehicle and the robot device.

15. The method according to claim 14, further comprising:
    defining a time slot for a vehicle movement of the vehicle within an area close to the robot device;
    wherein in the time slot, instructing the robot device to move the movable arm to a position away from the vehicle movement.

* * * * *